United States Patent [19]

Schmidt et al.

[11] 4,396,332
[45] Aug. 2, 1983

[54] STACKING DEVICE FOR WIRE GRIDS

[75] Inventors: Gerhard Schmidt; Klaus Ritter; Gerhard Ritter, all of Graz, Austria

[73] Assignee: EVG Entwicklungs-u. Verwertungs Gesellschaft mbH, Graz, Austria

[21] Appl. No.: 274,063

[22] Filed: Jun. 16, 1981

[30] Foreign Application Priority Data

Jun. 16, 1980 [AT] Austria ................................ 3165/80

[51] Int. Cl.³ .................... B65H 31/34; B65H 31/36; B21D 43/22
[52] U.S. Cl. ........................................ 414/35; 414/80; 414/908
[58] Field of Search .................... 414/35, 43, 54, 76, 414/80, 81, 82, 908, 27, 30, 46

[56] References Cited

U.S. PATENT DOCUMENTS

| 2,333,479 | 11/1943 | Graf | 414/80 |
| 2,341,793 | 2/1944 | Keil | 414/43 |
| 2,585,076 | 2/1952 | Bandura et al. | 414/35 |
| 3,109,543 | 11/1963 | Fingerut | 414/43 |
| 3,306,144 | 2/1967 | Nordgren | 414/76 |

FOREIGN PATENT DOCUMENTS 2744061 9/1977 Fed. Rep. of Germany ........ 414/35

Primary Examiner—Robert J. Spar
Assistant Examiner—Janice Krizek
Attorney, Agent, or Firm—Ernest F. Marmorek

[57] ABSTRACT

A stacking device for wire grids such as those welded grids used for reinforcing concrete, has vertical guides into which the free ends of a selected longitudinal wire of the grid slide so as to form a stack, one grid on top of another. One of the vertical guides can be pivoted out of its vertical position so as to release the stack onto a transporting device for removal.

4 Claims, 3 Drawing Figures

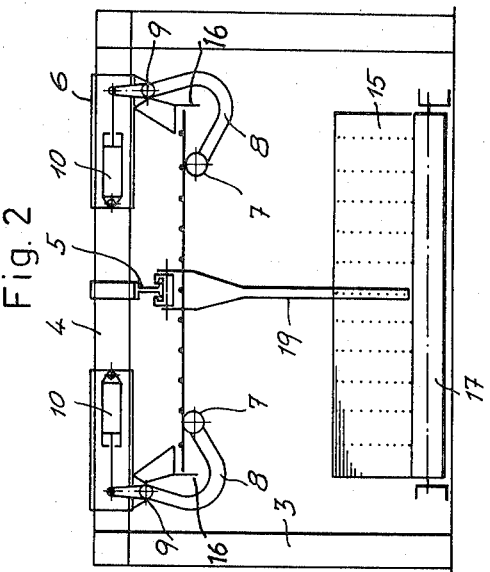
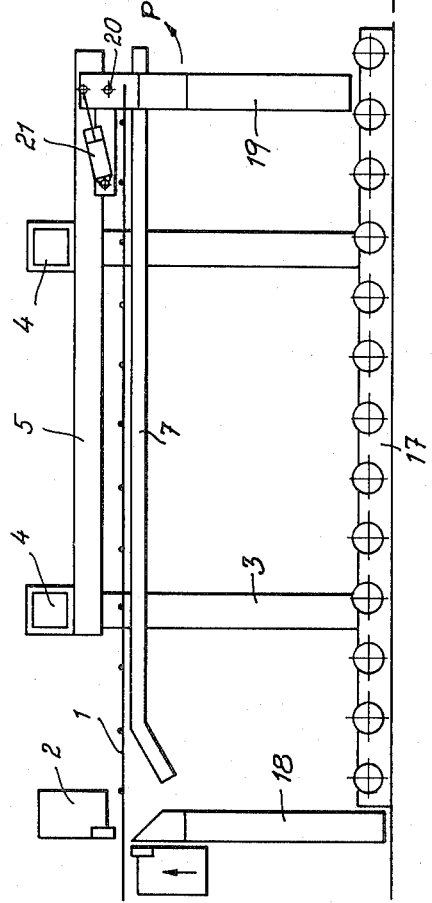
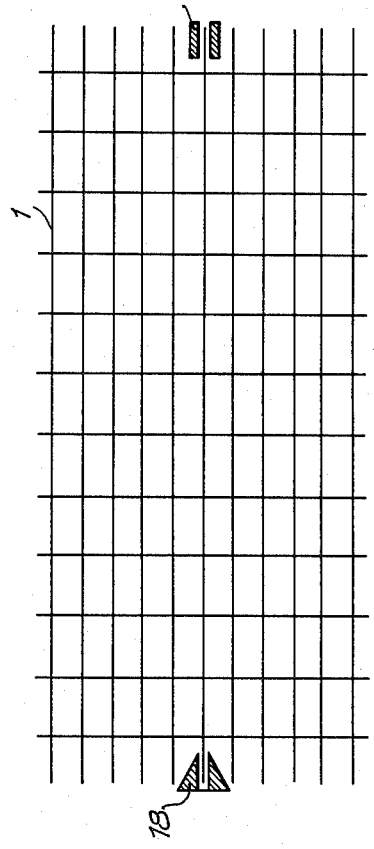

STACKING DEVICE FOR WIRE GRIDS

The invention relates to a stacking device for wire grids, especially welded reinforcing grids, the device having means for guiding the grids being discharged from the manufacturing machine beyond the deposition area of the stacking device and for releasing the grids above this deposition area, as well, preferably, as a roller path arranged in the deposition area of the stacking device for receiving the stacked grids.

Various devices of this kind are known and these machines may have an up and downward moving platform provided with at least one roller path, the platform being lowered step by step to the lowest point in rhythm to the reinforcing grids being discharged by the manufacturing machine (see German Patent Application Publication DE-OS No. 20 14 707).

If by means of these devices it is intended to produce high stacks of grids, it is essential that the lifting platform can be lowered below the floor of the workshop. Also, in order to remove the heavy stacks of mats from the lifting platform, the platform must be raisable again to the level of the shop floor with the stacked grids on the platform.

The step by step lowering and subsequent lifting up again of the heavy stack of grids results in an unnecessary waste of energy and requires correspondingly powerful drive means. As an additional difficulty there is the need of producing a pit in the floor of the workshop for receiving the platform when it is lowered.

A further known device for stacking grids can also alternately turn over the grids, prior to depositing the grids in a stack, so as to reduce the stack height. This device has arms with holders, which can travel along vertical plates for guiding and temporarily retaining each grid until it is stacked (see Austrian Patent AT-PS. No. 321.075).

In this device, in which the travelling arm advances each grid just slightly above the level of the surface of the stack of grids and which then deposits on the stack the respective grid held on the arm, only individual grids and not the whole stack is moved. The requirements and efficiency of the drive means are therefore substantially less than in the first device, but it requires relatively complicated control means in order to guide each grid into the correct position with regard to the surface of the grids already stacked.

It is an object of the invention to solve the problem of stacking grids precisely one above the other with a minimum use of energy and the use of simple technical means.

According to the invention a stacking device for wire grids such as reinforcing grids, has means for guiding the grids received from a manufacturing machine to a location above the deposition area, and means for releasing the grids above the deposition area, wherein a pair of opposed vertical guides are provided to receive end sections of a selected longitudinal wire of each of the grids to be stacked, the guides extending to the deposition area, one of the guides being movable out of engagement with the end of the grids for releasing the stack of grids.

In this way it can be achieved that during the dropping of the grid the front and rear end sections of a longitudinal wire of each grid released above the area of deposition automatically enter the preferably funnel-shaped expanded upper end parts of the vertical guides, so that the grids are stacked with precisely aligned longitudinal and transverse wires without requiring movable and mechanically driven machine parts.

According to a further feature of the invention, if the vertical guide for the front ends of the grids is arranged for adjusting and fixing, along a support rail in the direction of advancement of the grids, the stacking device can be adapted to widely differing grid lengths.

In a preferred embodiment the vertical guide for the front ends of the grids is formed by an arm of a two-arm lever, to the other arm of which is connected the piston rod of a working cylinder through which the guide can be pivoted from its vertical operating position into a practically horizontal position. This enables the stacked grids to be rapidly pushed beneath the pivoted vertical guide and out of the area of deposition, and the device prepared for receiving fresh grids.

The invention will now be described in more detail with the aid of the drawings which depict one example of a device according to the invention. There is shown in:

FIG. 1 a side elevation of the stacking device according to the invention;

FIG. 2 an associated front elevation; and,

FIG. 3 a plan view of the stacked grids depicting the vertical guides for the exposed end sections of the central longitudinal wire.

In FIG. 1 it is assumed that continuous lattice strip discharged by the manufacturing machine first of all passes a cutter 2 and is thereby split into grids 1 of the required length.

In a frame 3 there are arranged transverse beams 4 and a support rail 5. Adjustable and fixable holders 6 for support bars 7 are fastened to the transverse beams 4. The support bars 7 are arranged on one arm of a twin-arm lever 8 which is swivel mounted on pivots 9. Working cylinders 10 with their piston rods connected to the other arm of the twin-arm lever 8 can pivot the levers 8 about pivots 9 out of the working position shown in FIGS. 1 and 2 so that the support bars 7 release the grids 1, which had previously been pushed onto the bars, whereupon these drop onto the stack of grids 15. The holders 6 for the twin-arm levers 8 also have limit panels 16 for the grids 1. These limit panels provide the grids with lateral guidance and also keep the grid ends down, horizontally protruding parts of the limit panels 16 and the support bars 7 exerting into the grid ends a force which prevents the grids from bending too much and thus leading to a premature sliding off the support bars 7. As can be seen in FIGS. 1 and 2, the stack of grids 15 rests on a roller path 17.

At the two ends of the stacking device there are provided vertical guides 18, 19 formed of two parallel rails, at least one of these guides, here the guide 19, intended for the outer end of the grid being arranged for adjustment and fixing along the support rail 5. Moreover, in the embodiment shown, the guide 19 is arranged as the one arm of a twin-arm lever swivelably supported on a pivot 20 and to the other arm of which there is connected the piston rod of a work cylinder 21. The guide 19 can therefore be pivoted out of the operating position by means of the work cylinder 21 in the direction of arrow P in FIG. 1 in order to release the stack of grids for transport.

As shown in FIG. 2, each guide 18, 19 at its upper end is expanded in a funnel-like manner so that even when the movement of one of the grids onto the support bars 7 is not absolutely precise, the end of a selected longitudinal wire of this grid, preferably its central longitudinal wire, can enter the vertical guides. As soon as the support bars 7 are pivoted to one side by the work cylinder 10, the grid cut from the discharging length of lattice by cutters 2 and now resting on the support bars 7, can drop down freely onto the stack. The end sections of the selected longitudinal wire thus reach the narrow region of the guides 18, 19 and lead the grid onto the stack in a precise position.

What we claim is:

1. A stacking device for wire grids such as welded reinforcing grids, the device defining a deposition area and having means for guiding the grids received from a manufacturing machine to a location above the deposition area, said means comprising support bars adapted to support said grids on their way to and to release said grids above said deposition area, limit panels for lateral guidance of said grids, said limit panels having horizontally protruding parts adapted to keep the ends of said grids down and to restrain, in combination with said support bars, said grids from bending excessively and from sliding off said support bars prematurely, said stacking device further including means for releasing the grids above the deposition area, wherein a pair of opposed substantially vertical guides are provided, each of said guides being composed of two upright rails horizontally spaced apart only a sufficient distance so as to receive therebetween end sections of a selected longitudinal wire of each of the grids received on said support arms, the guides extending to the deposition area and serving to guide the grids during their downward movement, one of the guides being movable out of engagement with the end of the grids for releasing the stack grids.

2. A stacking device according to claim 1, in which the vertical guides have upwardly expanded funnel-like extensions.

3. A stacking device according to claim 1 or claim 2, in which the vertical guide for the forward ends of the grids is adjustably and fixably arranged on a support rail 5 extending in the longitudinal direction of the grids.

4. A stacking device according to claim 1, in which the vertical guide for the forward ends of the grids is formed by one arm of a two-arm lever, and the device including a working cylinder having a piston rod, the piston rod being connected to the other arm of the lever to pivot the guide from its vertical operating position into a substantially horizontal position.

* * * * *